April 13, 1937.  B. M. JOHNSON  2,076,647

APPARATUS FOR REVIVIFYING CHARCOAL

Filed Aug. 20, 1934  3 Sheets-Sheet 1

INVENTOR.
BOYD M. JOHNSON

BY

ATTORNEY.

April 13, 1937.  B. M. JOHNSON  2,076,647
APPARATUS FOR REVIVIFYING CHARCOAL
Filed Aug. 20, 1934  3 Sheets-Sheet 3

INVENTOR.
BOYD M. JOHNSON
BY
ATTORNEY.

Patented Apr. 13, 1937

2,076,647

UNITED STATES PATENT OFFICE 2,076,647

APPARATUS FOR REVIVIFYING CHARCOAL

Boyd M. Johnson, Metuchen, N. J., assignor, by mesne assignments, to The Carborundum Company, Niagara Falls, N. Y., a corporation of Delaware Application August 20, 1934, Serial No. 740,628

7 Claims. (Cl. 202—114)

This invention relates to apparatus for revivifying bone black or char such as is used in decolorizing sugar solutions during the process of manufacture of refined sugar.

Bone black or char is made by charring bones in retorts and then crushing the charred material to granules whose average linear dimensions are about a tenth of an inch. The sugar syrup which is first run through the char filter is decolorized by the action of the char, the decolorizing action being apparently due to the nitrogenized carbon of the bone black. After the bone black has been used in filtering colored sugar solutions for some time, the filtrate begins to show a faint yellow color. This color increases in intensity until there is no commercial advantage in filtering through the particular char filter which has been in use. The char is then washed with water and thereafter treated with steam to displace the wash water. Drying of the char is effected by heating it, at first at a comparatively low temperature. For revivifying the char, the dried char is placed in narrow vertical retorts which are heated at various temperatures up to a bright red heat. The high temperature treatment of the char drives off certain impurities which had clogged porous granules of which the char is composed. The retorts are made of iron, for example cast iron. There has been considerable difference of opinion as to the temperature to which the retorts should be heated. Too high temperatures injure the quality of the char (possibly by reduction of the nitrogen content or by the breaking up of compounds which are characteristic of bone charcoal). The retorts in which the char is heated may be divided into several groups according to their position with reference to the heating chamber. The retorts into which the dried char is first placed are situated in an upper section of a kiln where the char is heated by means of waste gases which pass upward from the firing section of the kiln. The char from these upper retorts is fed downwardly to a lower section of the kiln which may be called the firing section. The heating of the retorts in this section is one of the principal purposes of the apparatus described in this application. The efficiency of the revivifying action depends largely on the attainment and maintenance of the optimum temperature in the retorts of this lower section. If the temperature is too low the revivifying action will be incomplete. If the temperature is too high the quality of the char may be injured and the iron retorts are likely to be oxidized to an extent which causes premature failure of the iron structure and requires renewal of the retorts. The problem which the applicant has had to face involves therefore an improvement in the distribution of heat among the retorts in which the revivifying action takes place.

The improvements in heat distributing apparatus which are the subject of the present invention are illustrated by means of the accompanying drawings in which.

Figure 1:
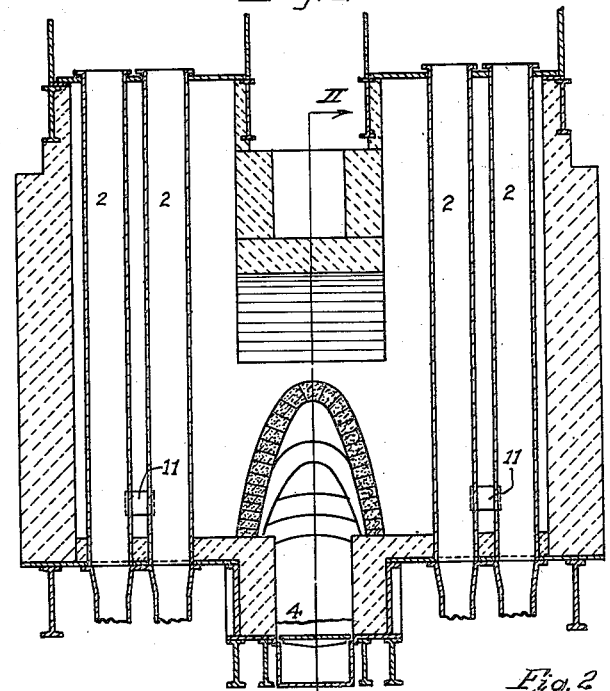
Figure 1 is a sectional elevation showing apparatus for distributing heat to four rows of retorts, two rows being arranged on each side of the heat distributor.

Referring to the drawings in detail, iron retorts 2 are packed with bone char which has previously been washed and dried and subsequently heated in an upper section of the kiln not shown. Connections between the retorts of the upper section (of the char heating apparatus just referred to) and the retorts shown in the drawings permit feeding to the latter of char which has undergone preliminary heating. In the apparatus shown in Figures 1, 2 and 3, heat is generated by means of coal fired on grates 3 in the space indicated by the reference numeral 4 in Figures 1 and 2. Air for combustion is admitted through holes 5 in the grate 3 which lies under the chamber or duct 4. The chamber 4 is elongated and is covered in part by means of two comparatively low arches, 6 and 7, which cover either end, and a higher arch 8 which projects over the middle portion of the chamber. Hot gases are carried out between the arches as indicated by the arrows A in Fig. 2. The high arch 8 serves to give the outflowing gases a general horizontal direction as they pass from under the high arch. The arches 6, 7 and 8 are made of a refractory material of high thermal conductivity and high emissivity, such as silicon carbide bonded with a small proportion of bond or recrystallized in a manner which makes it self-bonding. Heat is radiated in large quantities from the outer surfaces of the arches to the retorts 2. Heat is also transmitted to the retorts in large quantities by convection currents which pass out from the lower arches 6 and 7 and under the higher arch 8 as indicated by means of the arrows A in Fig. 2. The gases then continue down around the retorts to an outlet 11 and thence up through ducts 12 in the kiln wall. This circulation of hot gases supplements the heating of the retorts 2 produced by radiation from the arches 6, 7 and 8 and is especially effective in heating the outer rows of retorts which are further away from the radiating arches. The hot gases which flow up the ducts 12 can be employed to give a preliminary heat treatment to the bone char.

With the arrangements shown in the drawings and briefly described above, the lower portions of the retorts are heated more by radiation than the upper portions. The arches 6, 7 and 8 protect the lower portions of the retorts by shielding them from too direct impact of hot convection currents. The convection currents strike the lower portions of the retorts just before they pass through the outlet 11. On the other hand the lower portions of the retorts are closer to the radiating arches. This arrangement tends to increase the uniformity of heating of the retorts. Thus the transmission of heat (partly by radiation and partly by convection) tends to prevent too intense local heating in the lower ends of the retorts which are nearest to the combustion chamber. The reradiation of heat from the arches is much less intense than direct radiation from the inside walls of a combustion chamber would be where the distances involved are the same. The greater height of the central arch reduces the temperature of the outside surface of this arch which lies directly over the central part of the heat distributor. Tests of the efficiency of char restorers made in the past show that retorts arranged in rows adjacent to a heating chamber tend to have greater efficiency than retorts in outer rows. This difference is probably due to the higher temperature obtained in the inner rows of retorts. It is therefore desirable from the standpoint of more uniform quality in the revivified char to have the heat transmitted more equally among the retorts belonging to the inner and outer rows respectively. The improved kiln which is the subject of this invention contributes to such equalization.

Figure 2:
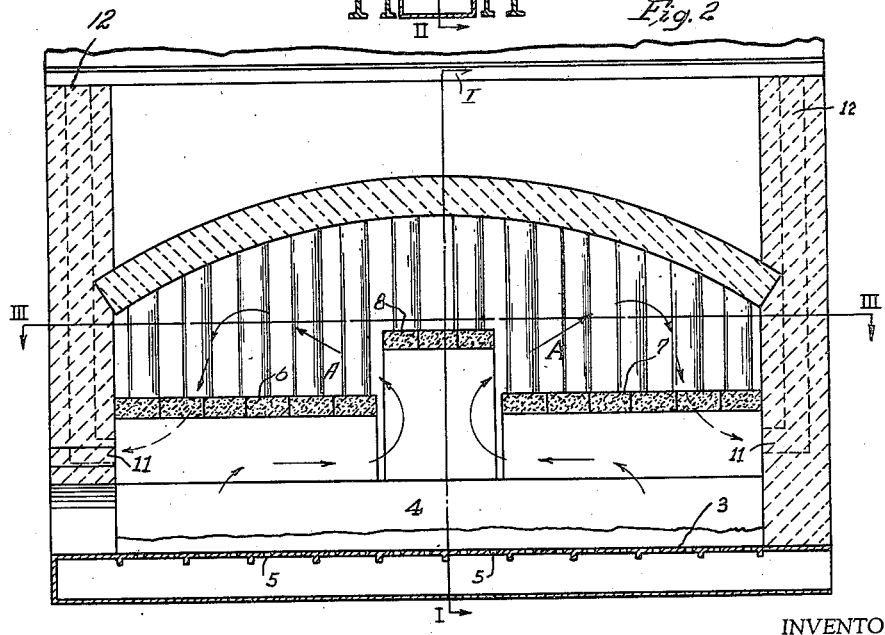
Figure 2 is a sectional elevation taken on the line II—II of Fig. 1.
Figure 3:
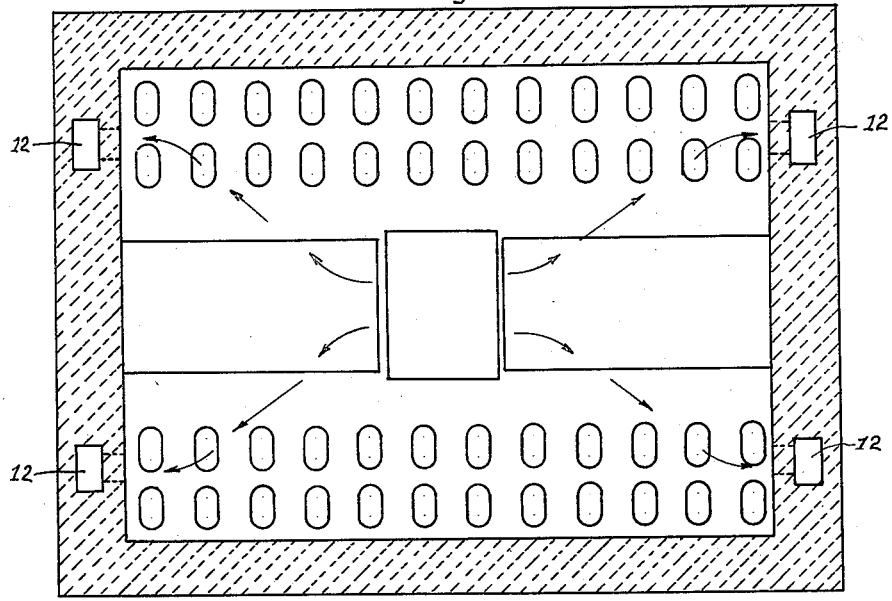
Figure 3 is a horizontal section taken on the line III—III of Fig. 2.
Figure 4:
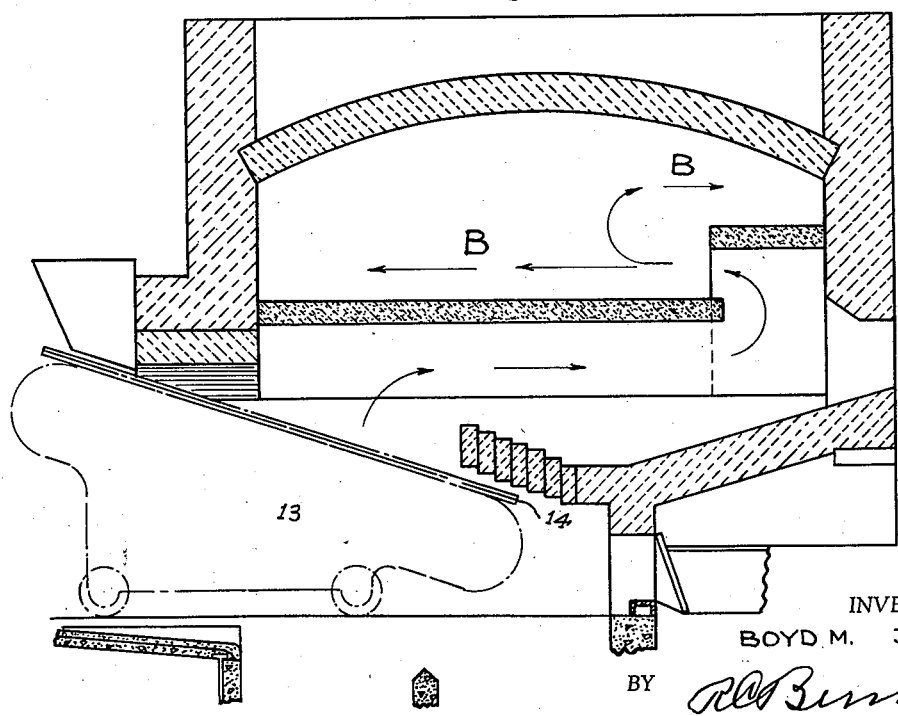
Figure 4 is a sectional elevation of a heat distributor in which the fuel is supplied for heat generation by means of a stoker and chain grate.

In the case of the apparatus shown in Figures 1, 2 and 3, coal can be supplied to the grate by manually operated means. In the case of the apparatus shown in Fig. 4 a mechanical stoker 13, with a chain grate 14, is used. The hot gases formed at the grate take a course indicated by the arrows B. The heat distributor and the arrangement of retorts is similar to that shown in Figs. 1, 2 and 3.

Figure 5:
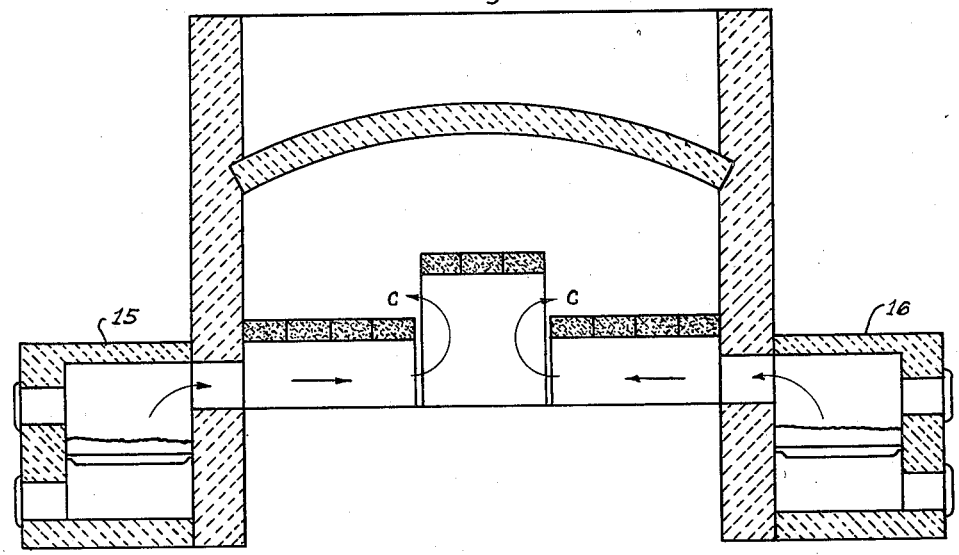
Figure 5 is a sectional elevation of a heat distributor for which the heat is supplied by means of two Dutch ovens, one located at each end of the distributor.

In the modification shown in Fig. 5 the heat is generated in two Dutch ovens 15 and 16, one placed near each end of the heat distributor. The hot gases are in this way introduced at the ends of the heat distributing and radiating duct (as indicated by the arrows C) instead of through the bottom.

Figure 6:
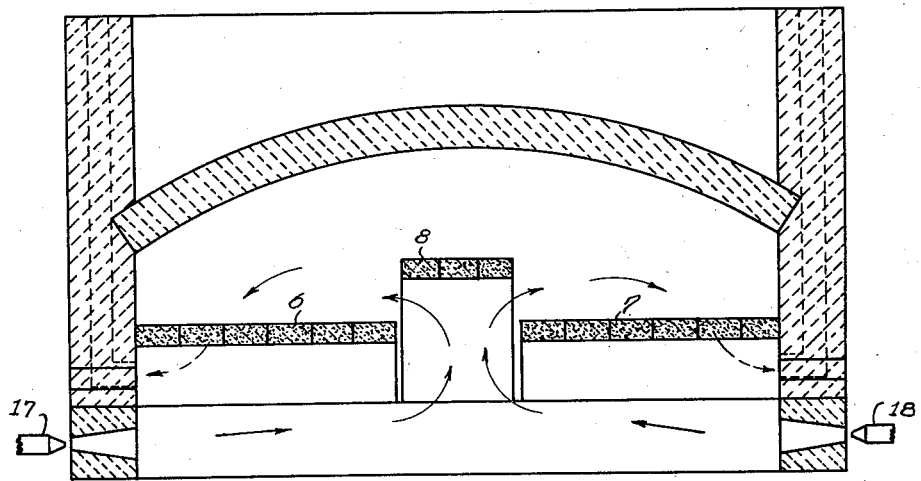
Figure 6 is a sectional elevation of a heat distributor in which the heat is generated by means of gas or oil burners.

In the modification shown in Fig. 6 gas or oil burners 17 and 18 are used to generate the heat for the distributing and radiating duct which is covered by the arches 6, 7 and 8. The heat distributor and the arrangement of the ducts is the same as shown in Figure 2.

The problem of heating the ducts to the optimum temperature is connected with the fact that cast iron heated in an oxidizing atmosphere slowly changes to iron oxide. The volume occupied by the iron oxide is considerably greater than the volume of the iron which it displaces. Hence the cast iron retorts bend over in the course of time so that the axis of the retort is convex toward the source of heat. This change in form is accompanied by a diminution in mechanical strength, and the life of the retort is therefore shortened by non-uniform heating. The applicant's invention is directed toward the prolongation of the life of the retorts by distributing the heat more uniformly around their circumstances.

The arches 6, 7 and 8 are made approximately in the forms of inverted catenaries. This form is especially good for self-supporting arches. This statement has been borne out practically in service conditions in high temperature kilns. As mentioned above, these arches consist mainly of silicon carbide. In addition to the advantages mentioned above (good thermal conductivity and high emissivity) the arches composed of suitably bonded silicon carbide are very strong mechanically even at temperatures far above those necessary for treating bone char, and have a low coefficient of expansion. The combination of the inverted catenary form and the bonded or recrystallized silicon carbide produces therefore a very satisfactory arch for the applicant's heat distributor.

While one form of the invention has been specifically illustrated and described, various changes in the forms or shapes of the distributor or in the materials of which it is constructed can be made without departing from the invention defined in the appended claims.

I claim:

1. Apparatus for revivifying bone charcoal and the like comprising an elongated heat distributor, a plurality of retorts extending in rows along the sides of the heat distributor, said distributor consisting of a high central arch and two lower arches disposed at either end of the high arch and opening into the lower part thereof while the high arch has outlets above the lower arches, and means for supplying hot gases underneath the arches, the relative heights of the arches being adapted to give the hot gases a large horizontal component of velocity toward the retorts.

2. Apparatus for revivifying bone charcoal and the like comprising an elongated heat distributor, a plurality of retorts extending in rows along the sides of the heat distributor, said heat distributor consisting of a high central arch composed of a material having high thermal conductivity and high emissivity, and of two lower arches of similar material disposed at either end of the high arch and opening into the lower part thereof, while the upper part of the high arch is open above the lower arches, and means for supplying hot gases underneath the arches, the relative heights of the arches being adapted to give the hot gases issuing between them a large horizontal component of velocity toward the retorts and to present a large radiating area to the retorts on both sides of the heat distributor.

3. Apparatus for revivifying bone charcoal and the like comprising an elongated heat distributor, a plurality of retorts extending in rows along the sides of the heat distributor, said heat distributor consisting of a high central arch composed mainly of silicon carbide and of two lower arches of similar material disposed at either end of the high arch and opening into the lower part thereof while the upper part of the high arch is open above the lower arches, and means for supplying hot gases underneath the arches, the relative heights of the arches being adapted to give the hot gases issuing therefrom a large horizontal component of velocity toward the retorts.

4. Apparatus for revivifying bone charcoal comprising a plurality of rows of retorts disposed on both sides of an arch whose lower surface occupies a higher level than the principal heating sections of the retorts and which has end openings for directing hot gases to the rows of retorts, a series of radiating arches disposed under the first mentioned arch and having their principal planes at right angles to that of the first mentioned arch, one of the radiating arches being centrally disposed with respect to the other radiating arches and extending to a greater height than the adjacent arches so that gas passages are provided between the central radiating arch and the adjacent radiating arches, and heating means disposed under the radiating arches for supplying the heat which is radiated from the radiating arches and for supplying the convection currents which pass out between the central radiating arch and the lower radiating arches toward and around the rows of retorts.

5. The apparatus described in claim 4 in which the radiating arches are constructed of a material having a substantially higher thermal conductivity and emissivity than fire-clay.

6. The apparatus described in claim 1 in which the radiating arches have approximately the forms of inverted catenaries.

7. The apparatus described in claim 4 in which the radiating arches have approximately the form of inverted catenaries.

BOYD M. JOHNSON.